United States Patent
Tanaka

(10) Patent No.: US 8,291,109 B2
(45) Date of Patent: Oct. 16, 2012

(54) DISTRIBUTION APPARATUS, COMMUNICATION SYSTEM AND COMMUNICATION METHOD

(75) Inventor: Ryo Tanaka, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 44 days.

(21) Appl. No.: 12/452,736

(22) PCT Filed: Jul. 24, 2008

(86) PCT No.: PCT/JP2008/063244
§ 371 (c)(1),
(2), (4) Date: Jan. 20, 2010

(87) PCT Pub. No.: WO2009/014163
PCT Pub. Date: Jan. 29, 2009

(65) Prior Publication Data
US 2010/0146034 A1    Jun. 10, 2010

(30) Foreign Application Priority Data
Jul. 24, 2007   (JP) .................................. 2007-192346

(51) Int. Cl.
*G06F 15/173*   (2006.01)
*G06F 15/16*   (2006.01)
*G06F 7/04*   (2006.01)
(52) U.S. Cl. ............................ 709/238; 709/201; 726/26
(58) Field of Classification Search .................. None
See application file for complete search history.

(56) References Cited

U.S. PATENT DOCUMENTS

| | | | |
|---|---|---|---|
| 6,343,072 B1 * | 1/2002 | Bechtolsheim et al. | 370/351 |
| 6,360,152 B1 | 3/2002 | Ishibashi et al. | |
| 7,698,039 B2 * | 4/2010 | Uchida et al. | 701/48 |
| 7,891,004 B1 * | 2/2011 | Gelvin et al. | 726/26 |
| 2008/0281485 A1 * | 11/2008 | Plante et al. | 701/35 |
| 2009/0138136 A1 | 5/2009 | Natsume | |

FOREIGN PATENT DOCUMENTS

| | | |
|---|---|---|
| JP | A-3-204254 | 9/1991 |
| JP | A-2000-284808 | 10/2000 |
| JP | A-2005-159568 | 6/2005 |
| WO | WO 2007/043608 A1 | 4/2007 |

OTHER PUBLICATIONS

International Search Report issued in Application No. PCT/JP2008/063244; mailed on Oct. 14, 2008.

* cited by examiner

*Primary Examiner* — Wen-Tai Lin
(74) *Attorney, Agent, or Firm* — Oliff & Berridge, PLC

(57) ABSTRACT

In view of a communication system including communication apparatuses transmitting data and a distribution apparatus receiving data from each communication apparatus and distributing, it is provided with the distribution apparatus, the communication system and the communication method that implement reducing amounts of storage means utilized for temporally storing data received by the distribution apparatus from each communication apparatus.
While the distribution apparatuses respectively include databases the databases are partitioned into common areas for storing data commonly shared with the distribution apparatuses and synchronized with each other, and non-common areas for storing data basically not transmitted between the ECUs connected to different communication lines. When receiving data from the ECU 4a, the distribution apparatus determines whether the received data should be stored on the common area or on the non-common area.

17 Claims, 8 Drawing Sheets

FIG. 3

| TYPE OF DATA | STORAGE AREA |
|---|---|
| WHEEL SPEED | COMMON AREA |
| STEERING ANGLE | COMMON AREA |
| OIL TEMPERATURE | NON-COMMON AREA (13a) |
| ROOM TEMPERATURE | NON-COMMON AREA (13b) |
| ... | ... |

DISTRIBUTION APPARATUS, COMMUNICATION SYSTEM AND COMMUNICATION METHOD

This application is the national phase under 35 U.S.C. §371 of PCT International
Application No. PCT/JP2008/063244 which has an International filing date of Jul. 24, 2008 and designated the United States of America.

BACKGROUND OF THE INVENTION

1. Field of the Invention

The present invention relates to a communication system comprising a plurality of communication apparatuses that transmit data and a plurality of distribution apparatuses that receive and distribute data being sent from each communication apparatus, the communication system allowing each distribution apparatus to distribute data toward each communication apparatus based on a request. Especially, the present invention relates to a distribution apparatus that implements reducing a traffic for data transmission for sending data to each communication apparatus and reducing a memory capacity of a storage means for temporally storing data received from each communication apparatus by a distribution apparatus, communication system comprising such a distribution apparatus and a communication method utilizing such a distribution apparatus.

2. Description of Related Art

It is recently known in several fields to utilize a system having many communication apparatuses, in which each communication apparatus is provided a certain function and connected with other communication apparatuses in order to perform variable operations through data exchange between many communication apparatuses. For example, it is known in a field of local area network (LAN) adapting for car to utilize electronic control units (ECUs) as the communication apparatuses, to make each ECU perform a certain operation and to exchange data between the ECUs, in order to provide various functions as a system.

A number and a type are increased of the communication apparatuses connected to a communication medium in a system, proportionally to a specializing degree of the function provided to each communication apparatus, as well as an increasing degree of the functions performed by the system. Furthermore, the system is expected to perform much more various functions. Thus, each communication apparatus is required to share data and to interact with other communication apparatuses. Then, it results in an increase of exchanged data amount.

To accommodate the increase of exchanged data amount, communication apparatuses of the system is generally classified into some groups, and then each group is connected to each of communication lines, respectively. Furthermore, it is thought to focus on data type treated by the groups of communication apparatus, and then to connect each group to each of communication lines respectively having different communication speed. In such a configuration, a communication line is connected with another communication line, by a gateway apparatus that relays data transmission.

Japanese Patent Application Laid-Open No. 2005-159568 discloses that: ECUs in a field of LAN adapting for car are classified into some groups; each group is connected to each of communication lines; the communication lines are connected to each other by a gateway apparatus; priority information is added to the received and the sent data to recognize data priority; the data priority is recognized through the priority information and the data having high priority is preferentially transmitted when the gateway apparatus performs data transmission between different communication lines, to prevent a transmission delay of data having high priority even when the communication lines take increased duty for data transmission.

SUMMARY OF THE INVENTION

When data transmission is performed between communication apparatuses respectively connected to different communication lines, it is not possible to reduce communication amount of communication lines in a configuration that a gateway apparatus receives any data being sent from each communication apparatus and sends such any data to another communication apparatus to transfer such any data between different communication lines.

The present invention was made in view of such circumstances, and has a primary object to provide: a distribution apparatus that sends data sent from each communication apparatus toward another communication apparatus, temporally stores received data in a storage means, selectively distributes data based on the type to each communication apparatus, and partitions the storage means into a common area for storing data duplicated in another apparatus and into a non-common area for storing the other data, in order to implement transmitting data efficiently and reducing duty for data transmission even in a case that the storage means has small amounts of recording capacity, with using a procedure distributing data to each communication apparatus as needed after a temporal storage in the storage means, because of no need to store data not sharing with any other distribution apparatus; communication system including the distribution apparatus; and a communication method utilizing the distribution apparatus.

Another object of the present invention is to provide a communication system that can minimize communication amounts between distribution apparatuses and then can reduce duty for data transmission with using a configuration of transmitting data stored on a common area during a synchronizing period of distribution apparatuses.

Another object of the present invention is to provide: a distribution apparatus that can determine whether data should be stored in a common area or a non-common area with using a simple configuration of storing information which represents types of data stored in the common area and in the non-common area and of allowing the distribution apparatus to refer the information; and a communication system including such a distribution apparatus.

Another object of the present invention is to provide: a distribution apparatus that can send data, which is not stored on own common area due to minimize amounts of data shared with another apparatus, through obtaining such data from another apparatus with using a configuration of giving information about data types stored on non-common area of another apparatuses into the information which represents types of data stored in a common area and in a non-common area ; and a communication system including such a distribution apparatus.

Another object of the present invention is to provide: a distribution apparatus that can flexibly minimize amounts of data duplicated and stored in another apparatus with a configuration of modifying the information which represents types of data stored in a common area and in a non-common area, and can implement transmitting data efficiently and reducing duty for data transmission even in a case that the storage means happens to have small amounts of recording capacity, with using a procedure distributing data to each communication apparatus as needed after a temporal storage in the storage means; and a communication system including such a distribution apparatus.

A distribution apparatus according to first aspect of the present invention comprises a means for receiving data being sent from a plurality of external devices each of which transmits data including several types, storing means for storing received data, and a means for distributing data stored by the storing means toward an external device, wherein the storing means is partitioned into a common area for storing data common to another device and a non-common area for storing the other data; and the distribution apparatus further comprises: a determining means for determining whether data received from an external device is stored on the common area or the non-common area; a means for sending data stored on the common area toward another device; and a means for storing data being sent from another device onto the common area.

A distribution apparatus according to second aspect of the present invention comprises a means for storing storage destination information representing whether data should be stored on the common area or on the non-common area in accordance with a type of the data, wherein the determining means determines which area the data should be stored on, in accordance with the storage destination information.

A distribution apparatus according to third aspect of the present invention configures the storage destination information to comprise data type information to be stored in another device and further comprises: a means for judging, when receiving a sending request of data from an external device, whether an object data of the received sending request is stored on another device or not; and a means for sending a sending request to said another device when it is judged that the object data is stored on said another device.

A distribution apparatus according to fourth aspect of the present invention configures the storage destination information to be able to modify.

A communication system according to fifth aspect of the present invention comprises a plurality of communication apparatus groups transmitting plural types of data and a plurality of distribution apparatuses according to any one of first to fourth aspect each of which is connected to one group of the communication apparatus, wherein the distribution apparatus comprises: a means for sending data stored on the common area toward another distribution apparatus; and a means for storing data being sent from another distribution apparatus onto the common area, wherein when data being sent from each communication apparatus is received, the data is determined by the determining means to be stored on the common area or the non-common area.

A communication system according to sixth aspect of the present invention configures the storage destination information to comprise information about data type stored on the non-common area of each distribution apparatus; and configures each distribution apparatus to comprise: a means for deciding, when receiving a data sending request from each connected communication apparatus, whether the object data for the received sending request is stored on the non-common area of the other distribution apparatus or not; and a means for sending, when deciding that the data is stored on the non-common area of the other distribution apparatus, a sending request toward the other distribution apparatus.

A communication system according to seventh aspect of the present invention configures the distribution apparatus to comprise: a means for detecting a new connection of one communication apparatus; a means for obtaining, when detecting the new connection, a type of data being sent from said one communication apparatus; a means for adding the obtained type of data onto the storage destination information; and a means for sending the storage destination information after the addition toward another distribution apparatus.

A communication system according to eighth aspect of the present invention configures the distribution apparatus comprises: a means for detecting a disconnection of one communication apparatus; a means for obtaining, when detecting the disconnection, a type of data being sent from said one communication apparatus; a means for deleting the obtained type of data from the storage destination information; and a means for sending the storage destination information after the deletion toward another distribution apparatus.

A communication method according to ninth aspect of the present invention is a method of transmitting data that is sent from each communication apparatus by a plurality of distribution apparatuses each of which is connected to a group of plural communication apparatuses transmitting several types of data, receives data being sent from each communication apparatus, stores received data on a storing means and distributes stored data to each communication apparatus, wherein the storing means is partitioned into a common area for storing data common in the plurality of distribution apparatuses and a non-common area for storing the other data; and the distribution apparatus determines, when storing data received from a communication apparatus, whether the received data is stored on the common area or the non-common area, sends data stored on the common area toward another distribution apparatus, and stores data received from another distribution apparatus onto the common area In accordance with an aspect of the present invention, data are sent from a plurality of external devices, received by a distribution apparatus, temporally stored by a storage means, and then are sent to external devices respectively. The storage means is partitioned into a common area for storing data shared with another distribution apparatus and a non-common area for storing the other data stored only a respective distribution apparatus. Data is sent from an external device, received by a distribution apparatus, and then is determined to be stored on which area by the distribution.

In accordance with an aspect of the present invention, a plurality of communication apparatuses can be classified into some groups and each communication apparatus can be connected to a distribution apparatus. In such configurations, data stored on a common area of a distribution apparatus is sent to another distribution apparatus, data being sent from another distribution apparatus is stored on the common area of the distribution apparatus, and then contents of data stored on the common area is synchronized.

In accordance with an aspect of the present invention, a distribution apparatus determines whether data being sent from an external device should be stored on a common area or a non-common area. For determining, the distribution apparatus refers a storage destination information which represents types of data stored in a common area and in a non-common area.

In accordance with an aspect of the present invention, storage destination information includes information which represents types of data to be stored in another apparatus, while being referred by a distribution apparatus. When sending data, the distribution apparatus judges whether the data to be sent is stored in another apparatus or not through referring to the storage destination information. When the data to be sent is stored in another apparatus, a sending request is additionally sent to said another apparatus.

In accordance with an aspect of the present invention, it is possible to correspond to a change of data being sent from an external apparatus to a distribution apparatus, because it is possible to modify storage destination information referred by the distribution apparatus. In other words, it is possible to modify contents of the storage destination information based an additional connection and a disconnection of an external apparatus.

In accordance with an aspect of the present invention, a distribution apparatus stores data transmitted with another apparatus each other onto a common area, and stores the other data onto a non-common area. Thus, all data stored by the storage means do not always duplicate in another distribution apparatus. This configuration can prevent a wasteful utilization of the storage means caused by allowance of storing data being never read out, more than a configuration of transmitting all data stored in a distribution apparatus to another apparatus and of synchronizing stored contents. Therefore, it is possible to transmit data efficiently and reduce duty for data transmission, even in a case that the storage means has minimized amounts of recording capacity, with using a procedure that a distribution apparatus stores data received from each communication apparatus and that data needed by a communication apparatus belonging into another group is sent from the distribution apparatus after a synchronization between distribution apparatuses.

In accordance with an aspect of the present invention, furthermore, it is possible to reduce communication amounts of data transmitted between distribution apparatuses and then to reduce duty for data transmission because data stored on a common area are transmitted between the distribution apparatuses.

In accordance with an aspect of the present invention, it is possible to determine with using a simple configuration that a distribution apparatus previously stores a storage destination information representing data storing area based on data type, and refers to the storage destination information in order to determine whether received data should be stored on a common area or on a non-common area when determining.

In accordance with an aspect of the present invention, even in a case that data is stored on a non-common area of another apparatus in order to minimize amounts of data duplicated and stored in another apparatus, it is possible to recognize said another apparatus storing such data on own non-common area. Therefore, a distribution apparatus can obtain data not stored on own storage means from another apparatus, as data to be sent to a communication apparatus, and can send the obtained data to a communication apparatus.

In accordance with an aspect of the present invention, it is possible to modify contents of information which represents types of data stored in a common area and in a non-common area. Thus, it is possible to minimize amounts of data commonly stored by each distribution apparatus, in flexible response to an additional connection and a disconnection of a communication apparatus and further to a usage condition of data. Therefore, it is possible to transmit data efficiently and then reduce duty for data transmission, even in a case that a storage means of the distribution apparatus has smaller amounts of recording capacity, with using a procedure that data is once stored by the storage means and is distributed to each communication apparatus as needed.

The above and further objects and features of the invention will more fully be apparent from the following detailed description with accompanying drawings.

BRIEF DESCRIPTION OF THE DRAWINGS

FIG. 3 is an explanation view illustrating example contents of a reference table stored by the storage unit of the distribution apparatus according to the embodiment 1;

DESCRIPTION OF THE PREFERRED EMBODIMENTS

Hereinafter, embodiments of the present invention are described in detail with reference to drawings.

In these embodiments, a communication system according to the present invention is described in the context of a communication system adapting for car that is an on-board system connected to a plurality of ECUs to send and receive data based on a CAN (Controller Area Network) protocol.

(Embodiment 1)

Figure 1:
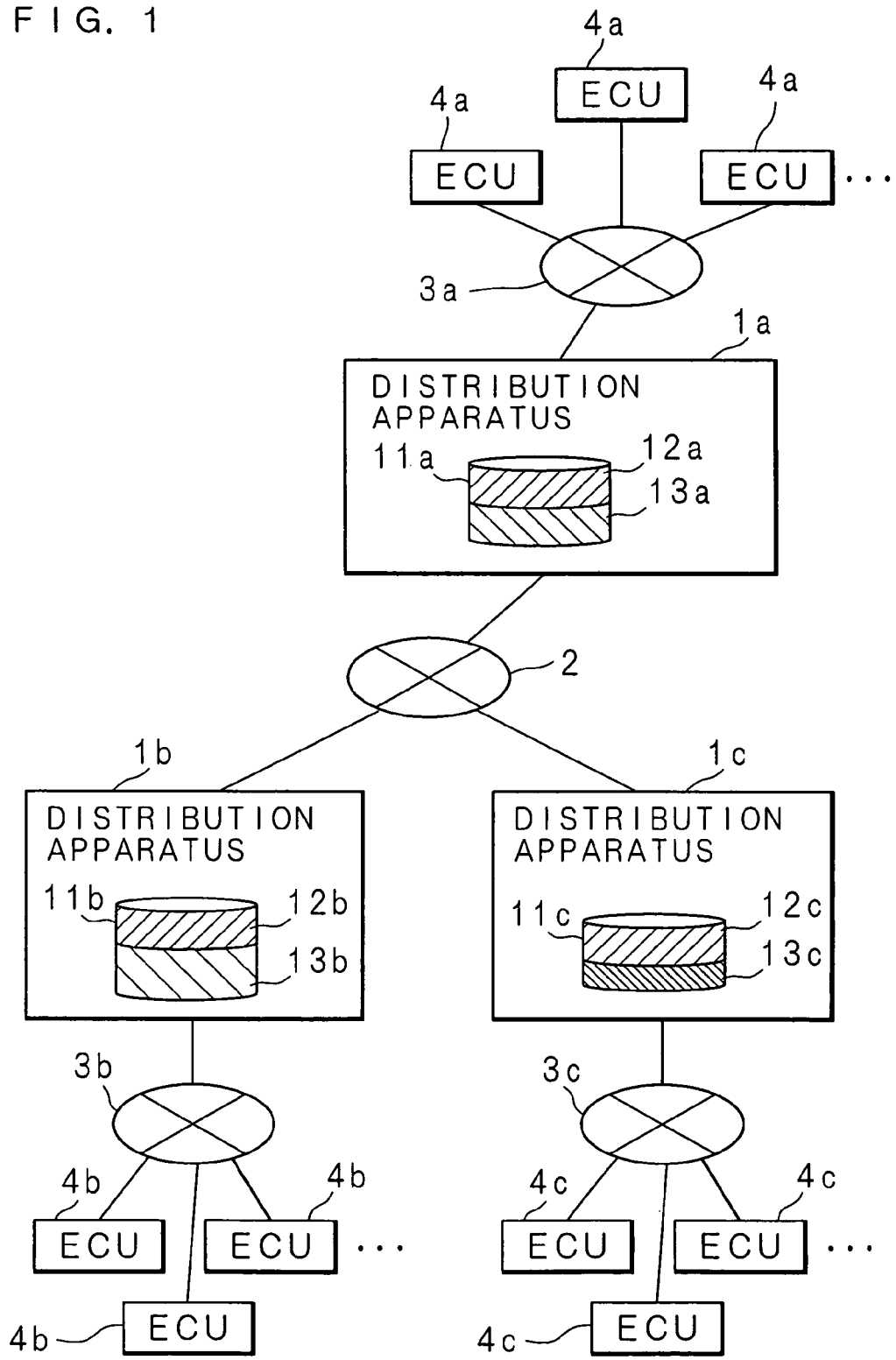
FIG. 1 is a block diagram showing components of a communication system adapting for car according to an embodiment 1.

FIG. 1 is a block diagram showing components of the communication system adapting for car according to the embodiment 1. The communication system adapting for car is configured with: electronic control units (ECUs) 4a, 4a, . . . , 4b, 4b, . . . , 4c, 4c, . . . , as communication apparatuses, that are classified into some groups and respectively send and receive data; communication lines 3a, 3b, 3c connected to the ECUs 4a, 4a, . . . , 4b, 4b, . . . , 4c, 4c, . . . for each group to communicate all the ECUs of each group; distribution apparatuses 1a, 1b, 1c that are connected to communication lines 3a, 3b, 3c, respectively, and distribute data to each of the ECUs 4a, 4a, . . . , 4b, 4b, . . . , 4c, 4c, . . . ; and a communication line 2 connecting the distribution apparatuses 1a, 1b, 1c together. The communication system adapting for car of the embodiment 1 is a trunking type network in which the distribution apparatuses 1a, 1b, 1c are connected to the communication line 2 being as one trunk and the ECUs 4a, 4a, . . . , 4b, 4b, . . . , 4c, 4c, . . . are classified into some groups through the distribution apparatuses 1a, 1b, 1c.

While the distribution apparatuses 1a, 1b, 1c are connected with each other through the communication line 2, the connection architecture (topology) may be a bus topology, star topology, daisy chain topology or the like. While the distribution apparatuses 1a, 1b, 1c are connected with the ECUs 4a, 4a, . . . , 4b, 4b, . . . , 4c, 4c, . . . through the communication lines 3a, 3b, 3c, the connection architecture (topology) also may be a bus topology, star topology, daisy chain topology or the like.

Each of the distribution apparatuses 1a, 1b, 1c includes a storage area, working as a database 11a, 11b, 11c. Basically, the distribution apparatus 1a stores data, being sent from the ECUs 4a, 4a, ... connected to the communication line 3a, into the database 11a, and sends data, being read out from the database 11a, toward the ECUs 4a, 4a, ....

The ECUs 4a, 4a, ..., 4b, 4b, ..., 4c, 4c, ... can send data including numerical information of several physical quantities, such as measured values, computed values and control values. Furthermore, the ECUs 4a, 4a, ..., 4b, 4b, ..., 4c, 4c, ... can control an engine, brake or the like, with utilizing a microcomputer. For example, an ECU 4a is connected with a sensor (not shown) for detecting rotation speeds of wheels (wheel speed), and works as an antilock brake system (ABS). The ECU 4a controls the brake in accordance with the wheel speed detected through the sensor during braking time of the car, and sends data including measured values of the wheel speed toward the distribution apparatus 1a.

In a case that data of the wheel speed being sent from the ECU 4a is utilized by another ECUs 4b, 4b, ..., 4c, 4c, ... connected to another communication lines 3b, 3c, the distribution apparatus 1a allows another distribution apparatuses to store the data of the wheel speed into the database 11b, 11c and to send the data of the wheel speed to the ECUs 4b, 4b, ..., 4c, 4c, .... Thus, each of the distribution apparatuses 1a, 1b, 1c sends data, being sent from the ECUs 4a, 4a, ..., 4b, 4b, ..., 4c, 4c, ..., toward another distribution apparatus 1a, 1b, 1c that receives the data and stores in own database 11a, 11b, 11c. Therefore, contents of the databases 11a, 11b, 11c are synchronized with each other, and it is possible that same data is shared by the ECUs 4a, 4a, ..., 4b, 4b, ..., 4c, 4c, ... connected to different communication lines 3a, 3b, 3c, respectively.

Furthermore, these configurations implements optimizing a timing of sending data from the distribution apparatuses 1a, 1b, 1c to the ECUs 4a, 4a, ..., 4b, 4b, ..., 4c, 4c, ... in accordance with operations performed by the apparatuses and the ECUs, sending data with an addition of another data based on the operation performed by the ECUs 4a, 4a, ..., 4b, 4b, ..., 4c, 4c, ..., or implements sending data after calculation as needed, because data are once stored by the distribution apparatuses 1a, 1b, 1c. Therefore, data can be sent efficiently from the distribution apparatuses 1a, 1b, 1c, and then it is possible to reduce the traffic for data transmission of the communication lines 3a, 3b, 3c.

It should be noted that the contents of the databases 11a, 11b, 11c must not been completely the same in the distribution apparatuses 1a, 1b, 1c according to the embodiment 1. While data are sent from the ECUs 4a, 4a, ..., 4b, 4b, ..., 4c, 4c, ..., some types of data may not be utilized by all the ECUs 4a, 4a, ..., 4b, 4b, ..., 4c, 4c, ... connected to distinctive communication lines 3a, 3b, 3c. For example, while the wheel speed data being sent from the ECU 4a may be utilized by the ECUs 4a, 4a, ... connected to the communication line 3a, the wheel speed data may not be utilized by the ECUs 4b, 4b, ..., 4c, 4c, .... If it is configured to store such data in all the databases 11a, 11b, 11c, the storage areas are happened to be utilized for storing needless data.

In view of such problems, the communication system adapting for car according to the embodiment 1 is configured to have distribution apparatuses 1a, 1b, 1c whose databases 11a, 11b, 11c are respectively partitioned into common areas 12a, 12b, 12c for storing data to be stored commonly in the distribution apparatuses 1a, 1b, 1c and non-common areas 13a, 13b, 13c for storing the other data, as shown by FIG. 1. The distribution apparatuses 1a, 1b, 1c transmit data stored on the common areas 12a, 12b, 12c with each other to synchronize contents, while storing data to be respectively utilized between the ECUs 4a, 4a, ..., ECUs 4b, 4b, ..., or the ECUs 4c, 4c, ... connected to communication lines 3a, 3b, 3c onto the non-common areas 13a, 13b, 13c.

Figure 2:
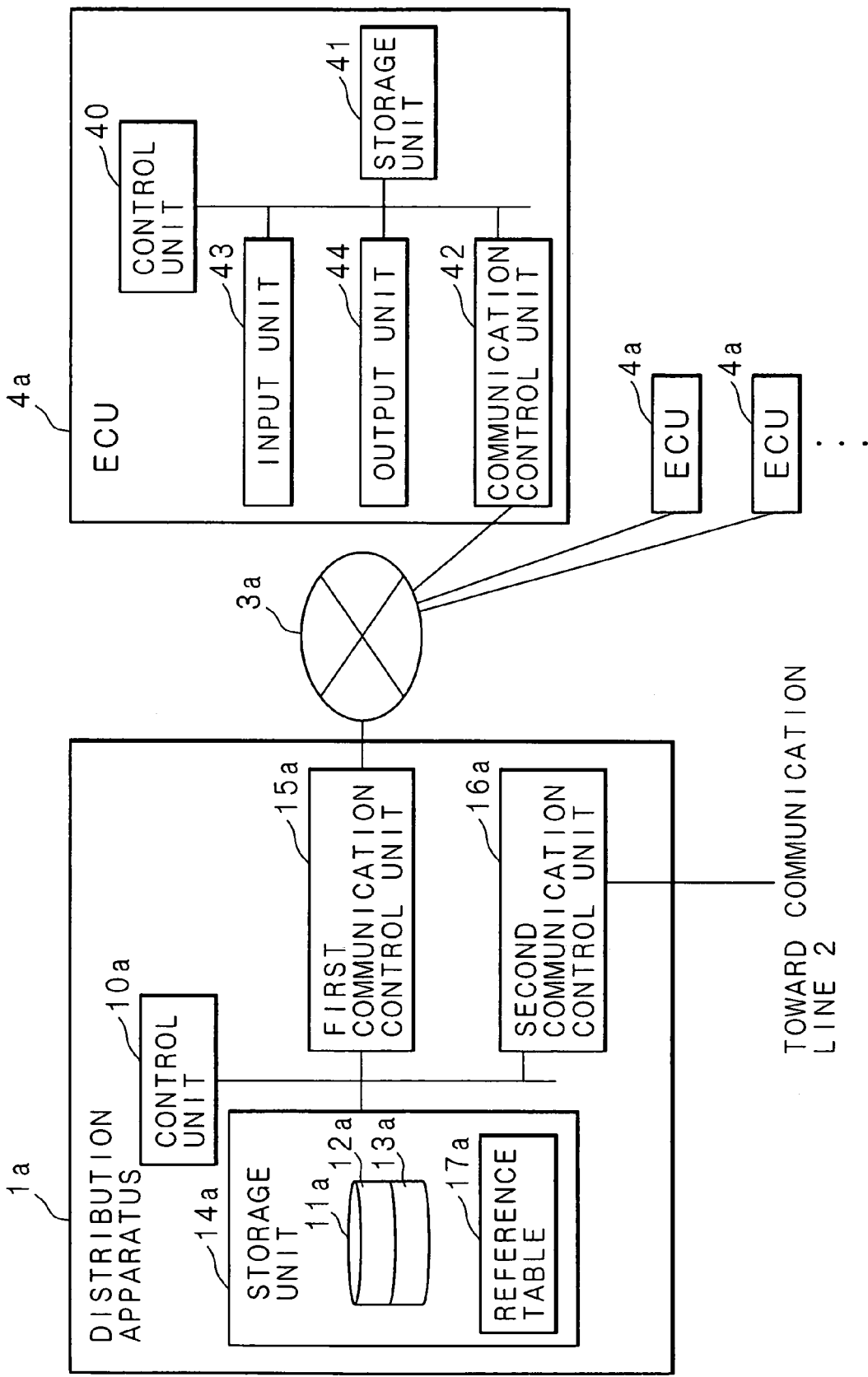
FIG. 2 is a block diagram showing inner components of a distribution apparatus and an ECU included in the communication system adapting for car according to the embodiment 1.

FIG. 2 is a block diagram showing inner components of the distribution apparatuses 1a, 1b, 1c and the ECUs 4a, 4a, ..., 4b, 4b, ..., 4c, 4c, ..., included in the communication system adapting for car according to the embodiment 1.

The distribution apparatus 1a includes: a control unit 10a that controls each component described bellow; storage unit 14a utilizing volatile memory; first communication control unit 15a connected to a communication line 3a; and a second communication control unit 16a connected to a communication line 2. The other distribution apparatuses 1b, 1c will not be described in detail, because having similar inner components as those of distribution apparatus 1a.

The control unit 10a is supplied with electric power from an electric power supply (not shown), such as an alternator or battery adapting for car, reads out a control program stored in nonvolatile inner memory (not shown), and executes the control program in order to control each component.

The storage unit 14a keeps a storage area for the database 11a storing data received from the ECUs 4a, 4a, ... by the control unit 10a. The control unit 10a picks up, for each data type such as "wheel speed", specific measured values, computed values and control values from the received data and stores in the database 11a.

The database 11a is partitioned into the common area 12a and the non-common area 13a, and the control unit 10a determines whether received data from the ECUs 4a, 4a, ... should be stored on the common area 12a or the non-common area 13a. For the determination, the storage unit 14a stores a reference table 17a which represents types of data to be stored on the common area and the non-common area based on types of data received from the ECUs 4a, 4a, .... The reference table 17a may be stored by the storage unit 14a, differently from the database 11a, as shown by FIG. 2. Alternatively, the reference table 17a may be stored on the common area 12a within the database 11a to store the same contents commonly in the distribution apparatuses 1a, 1b, 1c. The present invention is not limited to a format of the table. Alternatively, the present invention may describe data based on types of the data with utilizing indexes in the database 11a.

The first communication control unit 15a is connected with the ECUs 4a, 4a, ... via the communication line 3a, and implements data transmission with the ECUs 4a, 4a, .... The control unit 10a receives data from the ECUs 4a, 4a, ... and sends data to the ECUs 4a, 4a, ... through the first communication control unit 15a.

The second communication control unit 16a is connected with the other distribution apparatuses 1b, 1c via the communication line 2, and implements data transmission with the distribution apparatuses 1b, 1c. The control unit 10a sends data being read out from a common region 12a of the database 11a toward the other distribution apparatuses 1b, 1c through the second communication control unit 16a. In addition, the control unit 10a receives data being sent from the other distribution apparatuses 1b, 1c through the second communication control unit 16a.

The ECU 4a includes: a control unit 40 that controls each component described bellow; storage unit 41 utilizing nonvolatile memory; communication control unit 42 connected to the communication line 3a; input unit 43 that inputs a signal from a sensor (not shown); and an output unit 44 that outputs a control signal to an object device to be controlled (not shown). Other ECUs 4b, 4c will not be described in detail, because having similar components as those of ECU 4a. Anyway, the input unit 43 or the output unit 44 may be alternatively provided to one or more ECUs among the ECUs 4a, 4b, 4c.

The control unit 40 of the ECU 4a is supplied with electric power from an electric power supply (not shown), such as an alternator or battery adapting for car, detects a signal representing measured values being sent from the sensor (not shown) which is connected to the ECU 4a through the input unit 43, and sends a control signal toward the object device to be controlled which is connected to the ECU 4a through the output unit 44.

The storage unit 41 temporally stores several information generated during the operation of the control unit 40 or, for example, measured values represented by a signal being input from a sensor (not shown).

The communication control unit 42 has a network controller chip or network control function and implements communicating with the communication line 3a. The control unit 40 of the ECU 4a detects a signal coming from a sensor (not shown) periodically, for example every millisecond, and sends data including numerical information of physical quantities represented by the detected signal through the communication control unit 42. Further, the control unit 40 of the ECU 4a receives data being sent from the distribution apparatus 1a through the communication control unit 42.

The communication system adapting for car according to the embodiment 1 is configured as described above. It will be then described about an operation in the communication system that the control unit 10a of the distribution apparatus 1a store data being received from the ECU 4a, 4a, . . . onto the common area 12a or onto the non-common area 13a in reference to a reference table 17a stored by the storage unit 14a.

FIG. 3 is an explanation view illustrating example contents of the reference table 17a stored by the storage unit 14a of the distribution apparatus 1a according to the embodiment 1. As shown by the explanation view of FIG. 3, it is illustrated about storage area for storing each type of data. The example contents illustrated by FIG. 3 show that the wheel speed data and steering angle data should be stored on the common area 12a and oil temperature data should be stored on the non-common area 13a within the database 11a of the distribution apparatus 1a.

Furthermore, as shown by the explanation view of FIG. 3, it is illustrated by the reference table 17a stored by the storage unit 14a of the distribution apparatus 1a according to the embodiment 1 that room temperature data should be stored on the non-common area 13b within the database 11b of the distribution apparatus 1b. Therefore, the control unit 10a of the distribution apparatus 1a can recognize in reference to the reference table 17a that the room temperature data are not stored in the database 11a and that the room temperature data should be obtained from the distribution apparatus 1b because the room temperature data are stored on the non-common area 13b within the database 11b of the distribution apparatus 1b, for example, when the control unit 10a receives a sending request of the room temperature data sent from the ECUs 4a, 4a, . . . .

As shown by the explanation view of FIG. 3, the reference table 17a being stored by the storage unit 14a of the distribution apparatus 1a includes information about types of data stored on the non-common areas 13b, 13c within the databases 11b, 11c of another distribution apparatuses 1b, 1c. However, the present invention is not limited to these configurations. The table may represents about memory area that stores data only received from the ECUs 4a, 4a, . . . through the communication line 3a by the control unit 10a of the distribution apparatus 1a.

Next, it will be described about procedure that the control unit 10a of the distribution apparatus 1a stores data received from the ECUs 4a, 4a, . . . in the database 11a on the basis of the reference table 17a.

Figure 4:
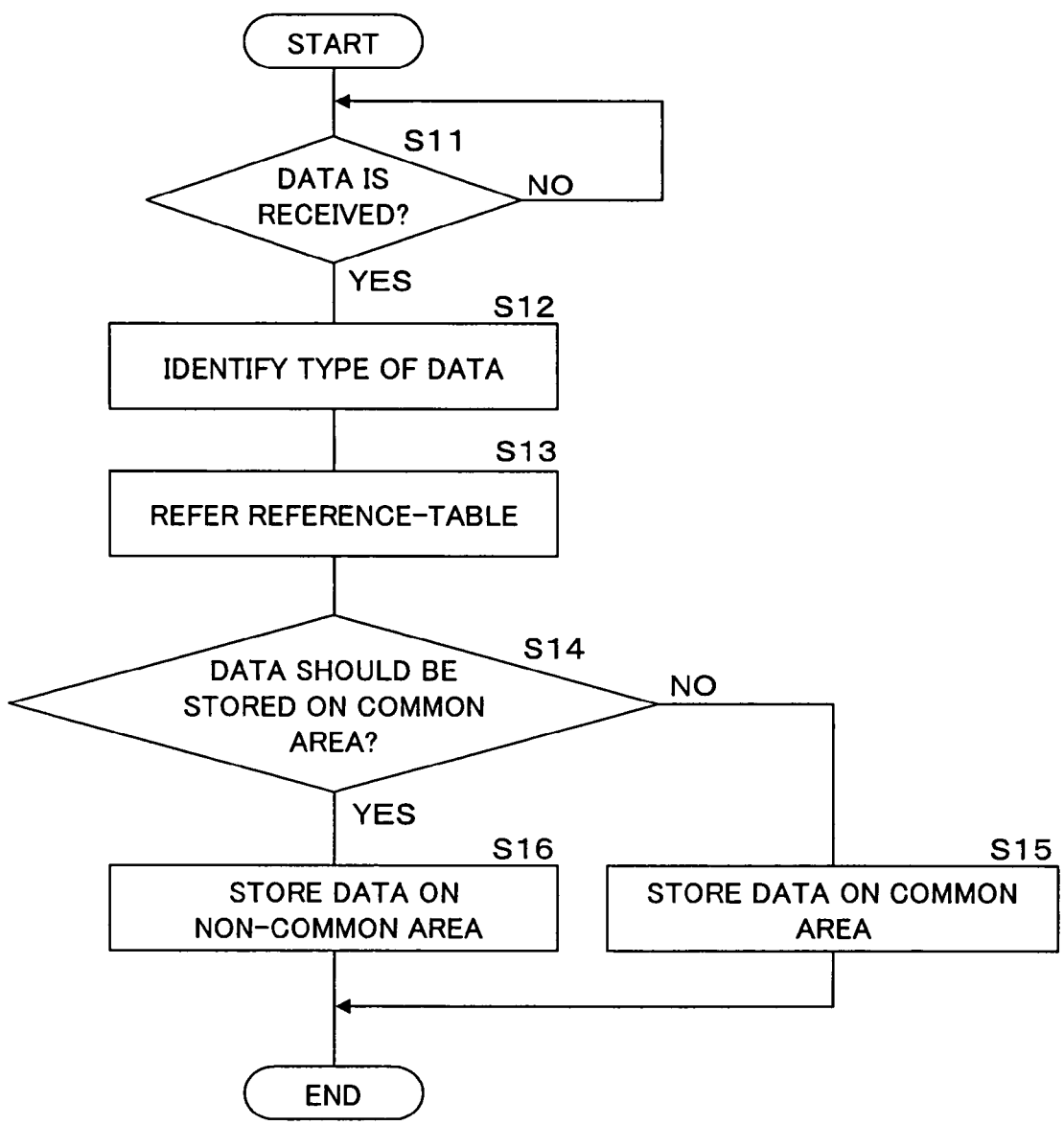
FIG. 4 is a flowchart showing a procedure for storing data received from the ECU into a database by a control unit of the distribution apparatus according to the embodiment 1.

FIG. 4 is a flowchart showing a procedure for storing data received from the ECUs 4a, 4a, . . . into a database 11a by a control unit 10a of the distribution apparatus 1a according to the embodiment 1. This procedure is similar to those of the other control units 10b, 10c of the other distribution apparatuses 1b, 1c. Thus, these procedures of the other control units 10b, 10c of the other distribution apparatuses 1b, 1c will not be explained in detail.

The control unit 10a of the distribution apparatus 1a judges whether data is received from any of the ECUs 4a, 4a, . . . or not (step S11). When the control unit 10a has judged that data is not received from any of the ECUs 4a, 4a, . . . (S11: NO), the procedure is returned to the step S11 and the control unit 10a waits until judging that data is received.

When judging that data is received from any of the ECUs 4a, 4a, . . . (S11: YES), the control unit 10a identifies a type of the received data (step S12). The control unit 10a refers the reference table 17a (step S13) and determines, on the basis of the identified type of the received data, whether the received data should be stored on the common area 12a or not (step S14).

When determining in reference to the reference table 17a that the received data should be stored on the non-common area 13a instead of the common area 12a (S14: NO), the control unit 10a stores the data received at the step S11 onto the non-common area 13a (step S15) and the procedure is completed.

When determining in reference to the reference table 17a that the received data should be stored on the common area 12a (S14: YES), the control unit 10a stores data received at the step S11 onto the common area 12a (step S16) and the procedure is completed.

As described above, it is configured to store data frequently utilized as shared data onto the common areas 12a, 12b, 12c and to store other data, than the data to be commonly read out, onto the non-common areas 13a, 13b, 13c. Therefore, it is possible to minimize amounts of data stored on a storage area within the storage units 14a, 14b, 14c, nevertheless the data not being read out by the control unit 10a, 10b, 10c.

For example, assume that each of the ECUs 4a, 4a, . . . utilizes the oil temperature data as shown by the explanation view of FIG. 3 with relatively high frequency and that each of the ECUs 4a, 4a, . . . rarely utilizes the room temperature data. In this assumption, even if being stored in the database 11a of the distribution apparatus 1a, the room temperature data are rarely read out from the database 11a. Thus, the storage area is wastefully utilized to store the room temperature data in this assumption. However, in the embodiment 1, it is possible to store minimized data, which is utilized with relatively high frequency on the basis of relationships with the ECUs 4a, 4a, . . . , onto the database 11a, because data is selectively stored on a partitioned area based on the reference table 17a: a common area 12a or a non-common area 13a.

Figure 5:
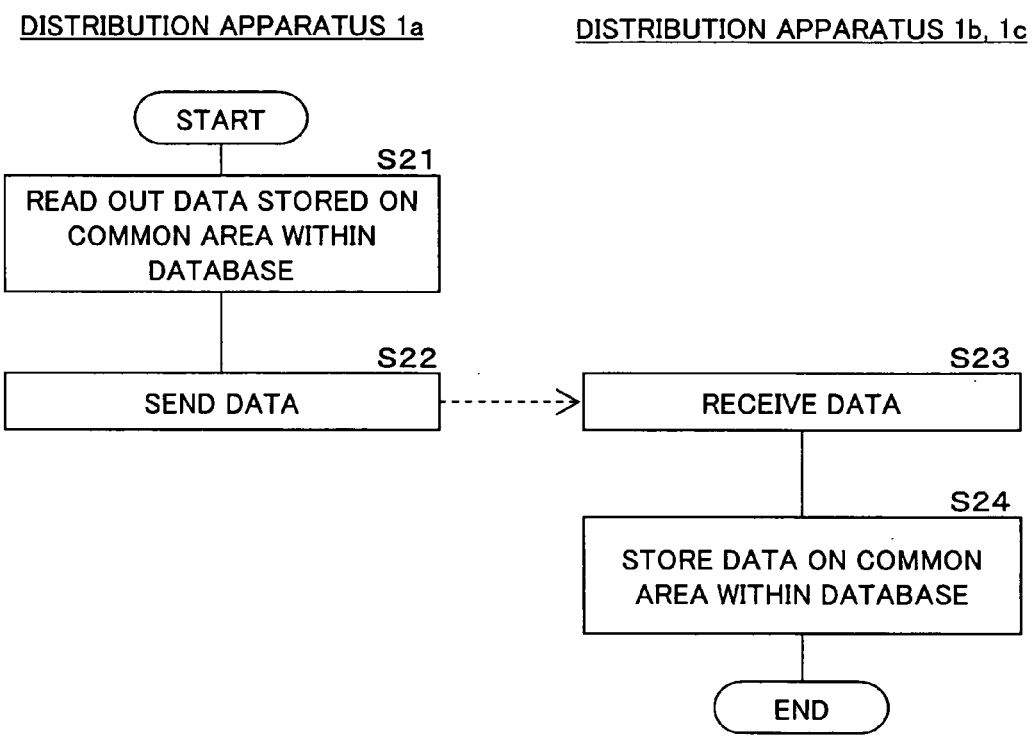
FIG. 5 is a flowchart illustrating one example procedure for synchronizing contents of the database between the distribution apparatuses according to the embodiment 1.

In the above description, the control unit 10a is configured to determine in reference to the previously stored reference table 17a whether the data received from the ECUs 4a, 4a, . . . should be stored on the common area 12a or on the non-common area 13a. It should be noted that the present invention is not limited to this configuration. The control unit 10a may be configured to refer a degree of importance attached to received data, and determine to store data attached higher degree of importance preferably on the common area 12a. Alternatively, the control unit 10a may determine to store data, which is requested of sending from other distribution apparatuses 1b, 1c with higher frequency, preferably on the common area 12a Next, it will be described about synchronization procedure that makes contents of the common areas 12a, 12b, 12c within the databases 11a, 11b, 11c of the distribution apparatuses 1a, 1b, 1c be the same. FIG. 5 is a flowchart illustrating one example procedure for synchronizing contents of the databases 11a, 11b, 11c between the distribution apparatuses 1a, 1b, 1c according to the embodiment 1.

For synchronizing the contents of databases 11a, 11b, 11c, the control unit 10a of the distribution apparatus 1a reads out data stored on the common area 12 within the database 11a (step S21), sends read data toward the distribution apparatuses 1b, 1c through the communication line 2 (step S 22). The control unit 10a may be configured to read out at the step S21 and send at the step S22 the data of the whole the common area 12a.

The control units 10b, 10c of the distribution apparatuses 1b, 1c receive data sent from the distribution apparatus 1a (step S23), respectively store the received data on the common areas 12b, 12c within the databases 11b, 11c (step S24), and the procedure is completed.

The flowchart of FIG. 5 shows the procedure of sending data for synchronization from the distribution apparatus 1a to the distribution apparatuses 1b, 1c. This procedure is similar to those of sending data from the distribution apparatus 1b to the distribution apparatuses 1a, 1c and of sending data from the distribution apparatus 1c to the distribution apparatuses 1a, 1b. For example, consider that the control unit 10b of the distribution apparatus 1b receives data being read out from the common area 12a and being sent from the distribution apparatus 1a. In this consideration, it may be desirable to make the control unit 10b store the received data at the step S24 only in a case that the received data is newer than data already stored on the common area 12b within the own database 11b.

As shown by the flowchart of FIG. 5, it is configured for the synchronizing the contents of databases 11a, 11b, 11c of the distribution apparatuses 1a, 1b, 1c to transmit only the data stored on the common areas 12a, 12b, 12c with each other. Thus, it is possible to minimize amounts of storage capacity of the storage units 14a, 14b, 14c through the selective usage of the common areas 12a, 12b, 12c and the non-common areas 13a, 13b, 13c. Furthermore, it is possible to reduce amounts of data transmitted by the communication line 2, in comparison with the amounts of data in the case of synchronizing whole data stored in the databases 11a, 11b, 11c. Therefore, these configurations lead advantages, such as reduction of traffic for data transmission.

Next, it will be described about procedure performed by the distribution apparatus 1a in a case that data are sent from the distribution apparatus 1a to the ECUs 4a, 4a, . . . . In the embodiment 1, a configuration is adopted that the ECUs 4a, 4a, . . . , 4b, 4b, . . . , 4c, 4c, . . . respectively send a sending request to the distribution apparatuses 1a, 1b, 1c connected to the ECUs through the communication lines 3a, 3b, 3c, and that the distribution apparatuses 1a, 1b, 1c read out data based on the sending request from the databases 11a, 11b, 11c and distribute the read data.

Figure 6:
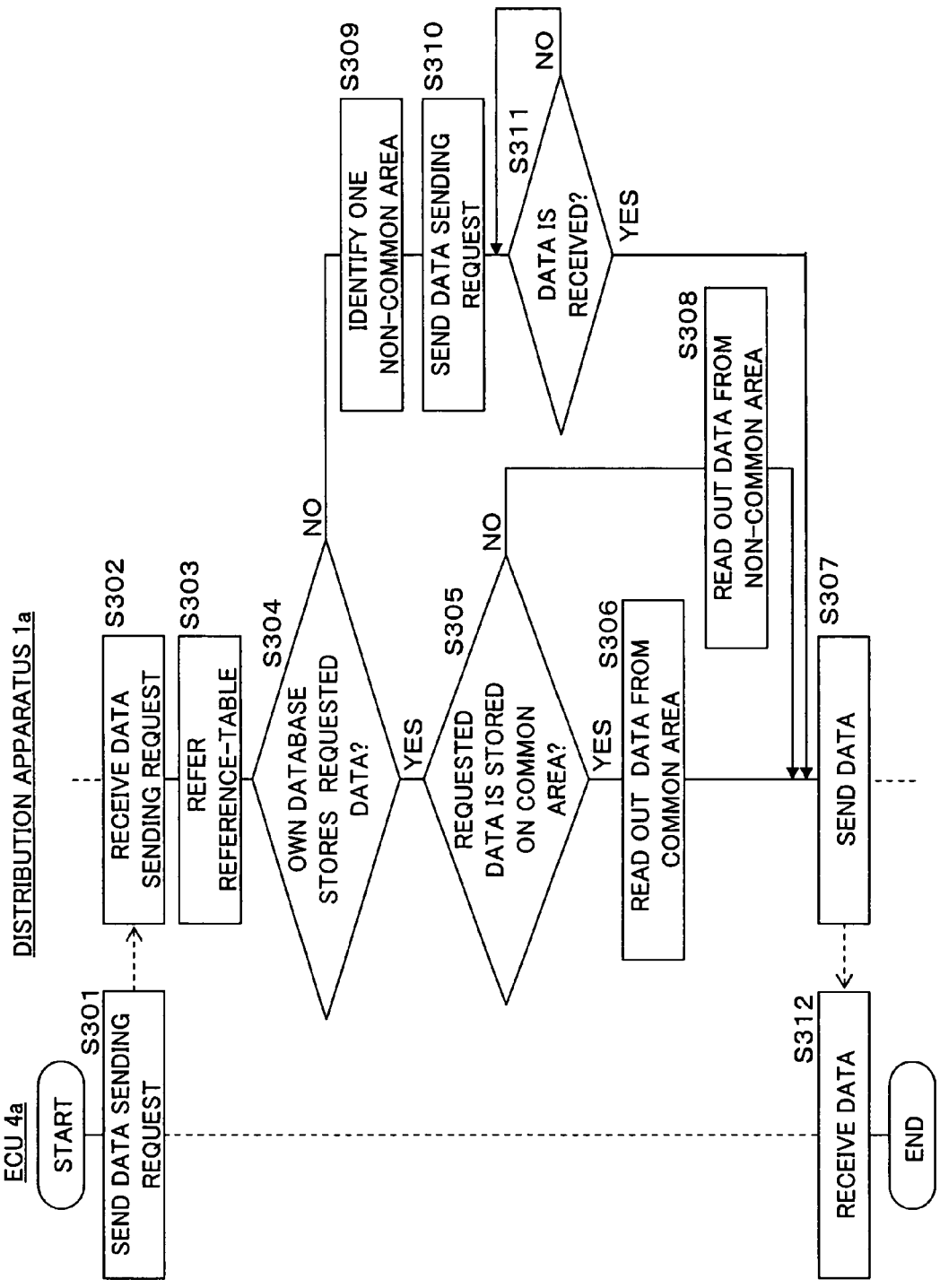
FIG. 6 is a flowchart showing a procedure for sending data by the control unit of the distribution apparatus according to the embodiment 1.

FIG. 6 is a flowchart showing a procedure for sending data by the control unit 10a of the distribution apparatus 1a according to the embodiment 1.

The control unit 40 of the ECU 4a sends a sending request of data intended to use from the communication control unit 42 to the distribution apparatus 1a connected to the ECU 4a through the communication line 3a (step S301).

The control unit 10a of the distribution apparatus 1a receives the sending request of data sent from the ECU 4a (step S302), refers the reference table 17a (step S303), and judges whether own database 11a stores the data intended to use represented by the sending request or not (step S304).

When having judged that own database 11a stores the data intended to use represented by the sending request (S304: YES), the control unit 10a further judges in reference to the reference table 17a whether the data intended to use represented by the sending request is stored on the common area 12a or not (step S305). When having judged that the data intended to use represented by the sending request is stored on the common area 12a (S305: YES), the control unit 10a reads out the data intended to use from the common area 12a (step S306), and sends the read data to the ECU 4a (step S307).

When having judged in reference to the reference table 17a that the data intended to use represented by the sending request is stored on the non-common area 13a instead of the common area 12a (S305: NO), the control unit 10a reads out the data intended to use from the non-common area 13a (step S308), and sends the read data to the ECU 4a (S307).

When having judged that own database 11a does not store the data intended to use represented by the sending request (S304: NO), the control unit 10a identifies in reference to the reference table 17a one of the non-common areas 13b, 13c that stores the data intended to use (step S309). For example, the control unit 10a identifies the non-common area 13b of the distribution apparatus 1b. Then, the control unit 10a sends a data sending request to the distribution apparatus 1b having the identified non-common area 13b (step S310). Next, the control unit 10a judges whether data is received from the requested distribution apparatus 1b or not (step S311). When the control unit 10a has judged that data is not received (S311: NO), the procedure is returned to the step S311 and the control unit 10a waits until judging that data is received. When having judged that data is received (S311: YES), the control unit 10a sends the received data to the ECU 4a (S307).

The control unit 40 of the ECU 4a receives data sent from the distribution apparatus 1a (step S312), and the procedure is completed.

When the distribution apparatus 1b receives the sending request sent at the step S310 in the procedure shown by the flowchart of FIG. 6, the control unit 10b of the distribution apparatus 1b performs operations similar to those from the step S302 to the step S303 and from the step S305 to the step S308 described above. The control unit 10b of the distribution apparatus 1b does not need to judge whether the own database 11b stores the data intended to use represented by the sending request (S304), because the sending request is sent after the non-common area 13b is identified as the area storing the data intended to use in reference to the reference table 17a.

As shown by the flowchart of FIG. 6, the control unit 10a of the distribution apparatus 1a refers the reference table 17a and then identifies the non-common area 13b that stores the data being not stored on any of the common area 12a and the non-common area 13a of own database 11a. Such identification is implemented because of the configurations that the reference table 17a includes information about data type stored on the non-common area 13b, 13c of the other distribution apparatuses 1b, 1c, in other words, because of the configurations that contents of the reference tables 17a, 17b, 17c are the same with each other.

However, the present invention is not limited to these configurations. The reference table 17a may includes no information about data stored on the non-common area 13b, 13c of the other distribution apparatuses 1b, 1c, instead may include only baseline information for the control unit 10a to determine a storage area of the data received from the ECUs 4a, 4a, . . . In this configuration, the control unit 10a of the distribution apparatus 1a may send a sending request to a distribution apparatuses 1b, 1c, with respect to data being not stored on the common area 12a and the non-common area 13a of own database 11a, without identifying one of the non-common areas 13b, 13c storing the data.

Embodiment 2

In an embodiment 2, it is configured to automatically modify the reference tables 17a, 17b, 17c stored by the storage units 14a, 14b, 14c of the distribution apparatus 1a, 1b, 1c on the basis of a new ECU 4x, when the new ECU 4x is further added to the configurations of the embodiment 1 described above, in addition to the ECUs 4a, 4a, . . . connected to the communication line 3a.

The embodiment 2 adopts configurations of the communication system adapting for car similar to the configurations of the embodiment 1. Thus, it will be described with the same numeral as the embodiment 1 about procedure that the reference tables 17a, 17b, 17c are updated when the ECU 4x is newly added, while the configurations common to the embodiment 1 will not be explained in detail.

The ECU 4x is configured similarly to the ECUs 4a, 4a, . . . , 4b, 4b, . . . , 4c, 4c, . . . . Thus, configurations of the ECU 4x will not be explained in detail.

In the embodiment 2, the ECUs 4a, 4a, . . . , 4b, 4b, . . . , 4c, 4c, . . . , 4x respectively have functions to send identification information that represent types of data being sent to the distribution apparatuses 1a, 1b, 1c by the ECUs and being received from the distribution apparatuses 1a, 1b, 1c by the ECUs in a case of being equipped and being activated into the communication system adapting for car. Furthermore, the ECUs 4a, 4a, . . . , 4b, 4b, . . . , 4c, 4c, . . . , 4x may have functions to send information about timing of receiving data, i.e., timing that the distribution apparatuses 1a, 1b, 1c send data to the ECUs 4a, 4a, . . . , 4b, 4b, . . . , 4c, 4c, . . . , 4x. Therefore, the control units 10a, 10b, 10c of the distribution apparatuses 1a, 1b, 1c can respectively recognize data sent from the ECUs 4a, 4a, . . . , 4b, 4b, . . . , 4c, 4c, . . . connected through the communication lines 3a, 3b, 3c, data to be sent to the ECUs 4a, 4a, . . . , 4b, 4b, . . . , 4c, 4c, . . . , and the timing of sending the data.

Thus, the control unit 10a of the distribution apparatus 1a refers the identification information and the timing information sent from the ECU 4x newly connected to the communication line 3a, and then judges whether sent data from the ECU 4x should be sent with a high frequency to the ECUs 4b, 4b, . . . , 4c, 4c, . . . connected to the other distribution apparatuses 1b, 1c or not. When having judged that the data should be sent with a high frequency, the control unit 10a determines that the data should be stored on the common areas 12a, 12b, 12c, and that otherwise data should be stored on the non-common area 13a. Alternatively, when having judged that the data has a degree of importance being previously attached on the basis of data type and being no less than a predetermined degree, the control unit 10a of the distribution apparatus 1a may determine that the data should be stored on the common areas 12a, 12b, 12c. When having judged that the data has a degree of importance being less than the predetermined degree, the control unit 10a may determine that the data should be stored on the non-common area 13a.

Figure 7:
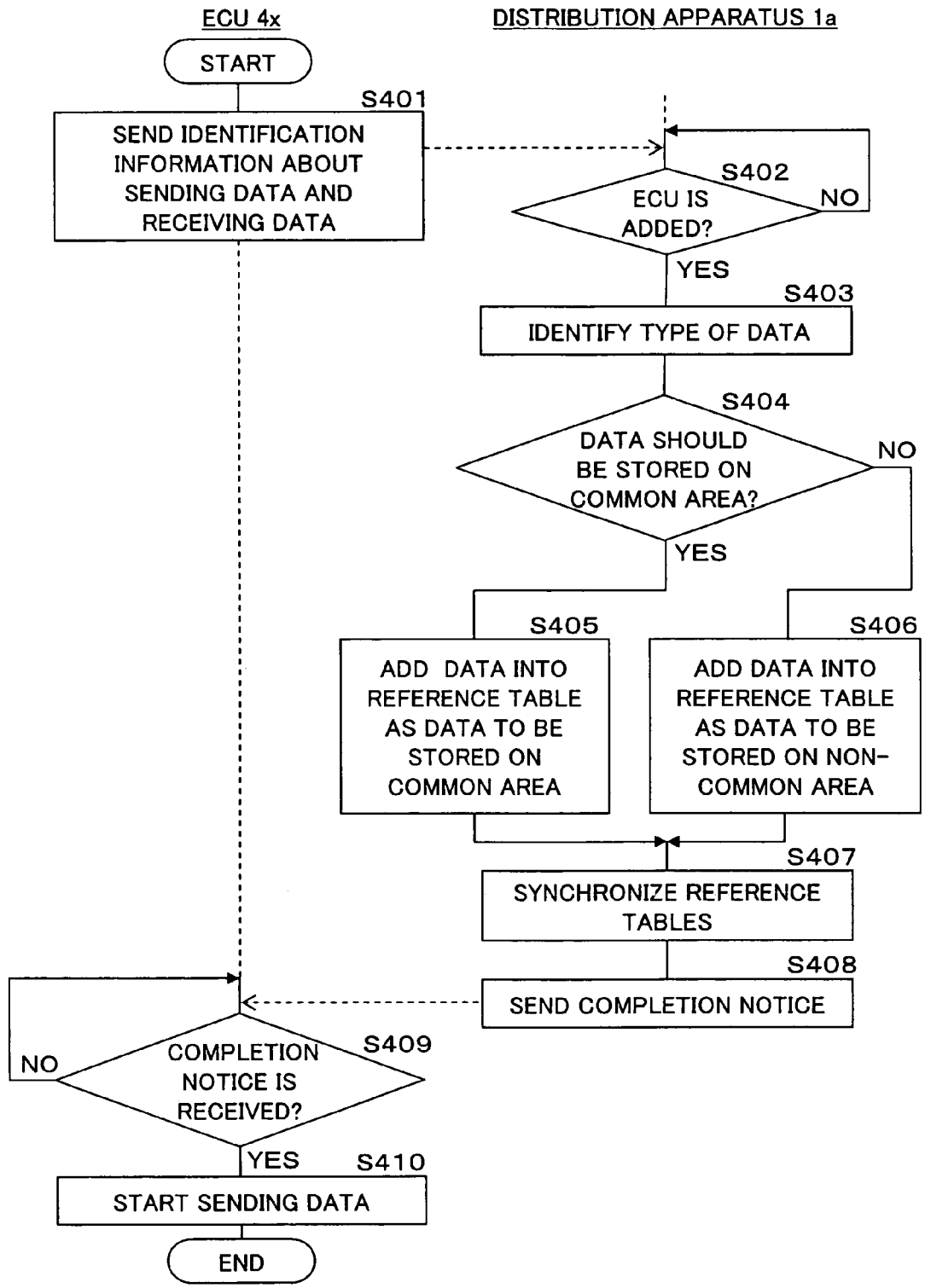
FIG. 7 is a flowchart showing a procedure for modifying the reference table by the control unit of the distribution apparatus according to an embodiment 2 in a case that a new ECU is additionally connected.

FIG. 7 is a flowchart showing a procedure for modifying the reference tables 17a, 17b, 17c by the control unit 10a of the distribution apparatus 1a according to the embodiment 2 in a case that the new ECU 4x is additionally connected.

When being quipped and activated into the communication system adapting for car, the control unit 40 of the ECU 4x sends identification information about sending data and receiving data of the ECU 4x (step S401).

The control unit 10a of the distribution apparatus 1a judges whether the ECU 4x is added or not, on the basis of a judgment whether identification information are received from the newly added ECU 4x about the sent data and the received data by the ECU 4x (step S402). When the control unit 10a has judged that the ECU 4x is not added (S402: NO), the procedure is returned to the step S402 and the control unit 10a waits until judging that the ECU 4x is added.

When having judged that the ECU 4x is added on the basis of receiving the identification information about the sent data and the received data by the ECU 4x (S402: YES), the control unit 10a identifies the type of data sent from the ECU 4x based on the received identification information about data (step S403). The control unit 10a judges on the basis of the identified type of data whether the data should be stored on the common area 12 or not (step S404).

When having judged that the sent data from the ECU 4x should be stored on the common area 12a (S404: YES), the control unit 10a treats the data to be stored on the common area 12a, i.e., to be stored even on the common areas 12b, 12c of the other distribution apparatuses 1b, 1c. Then, the control unit 10a adds the data into the reference table 17a (step S405). When having judged that the sent data from the ECU 4x should be stored on the non-common area 13a instead of the common area 12a (S404: NO), the control unit 10a adds the data, treated to be stored on the non-common area 13a, into the reference table 17a (step S406).

Next, the control unit 10a sends the reference table 17a, which is added the information representing whether the sent data from the ECU 4x should be stored on the common area 12a or the non-common area 13a, toward the other distribution apparatus 1b, 1c, in order to perform a synchronization (step S407). Then, the control unit 10a sends a completion notice to the ECU 4x that represents the completion of adding the sent data from the ECU 4x into the reference tables 17a, 17b, 17c (step S408).

The control unit 40 of the ECU 4x judges whether receiving the completion notice from the distribution apparatus 1a or not (step S409). When the control unit 40 has judged that the control unit 40 does not receive the completion notice (S409: NO), the procedure is returned to the step S409 and the control unit 40 waits until judging that the control unit 40 receives the completion notice. When having judged that the control unit 40 of the ECU 4x receives the completion notice (S409: YES), the control unit 40 starts sending data (step S410) and the procedure is completed.

When the ECU 4x is newly added, the control unit 10a of the distribution apparatus 1a modifies the reference table 17a and sends the modified reference table 17a to the other distribution apparatuses 1b, 1c as shown by the procedure of flowchart in FIG. 7. Thus, the contents of the reference tables 17a, 17b, 17c of the distribution apparatuses 1a, 1b, 1c become the same with each other. When the sent data from the ECU 4x should be stored on the common area 12a, the data is synchronized between the distribution apparatuses 1a, 1b, 1c and sent from the other distribution apparatus 1b, 1c to the ECUs 4b, 4b, . . . , 4c, 4c, . . . . When the sent data from the ECU 4x should be stored on the non-common area 13a and the ECU 4b requests the distribution apparatus 1b to send the data, the distribution apparatus 1a reads out the data from the non-common area 13a in response to a sending request sent from the distribution apparatus 1b, and sends the read data to the distribution apparatus 1b. Then, the distribution apparatus 1b receives the read data and sends the received data to the ECU 4x. Thus, it is possible to automatically modify the contents of the reference tables 17a, 17b, 17c in response to the addition of the new ECU 4x. Therefore, it is possible to implement a flexible response with respect to the addition of the new ECU 4x.

Next, it will be described about procedure in a case that the ECU 4x is, in contrast, disconnected from the communication line 3a and removed from the communication system adapting for car or that the ECU 4x becomes into a sleep mode.

Figure 8:
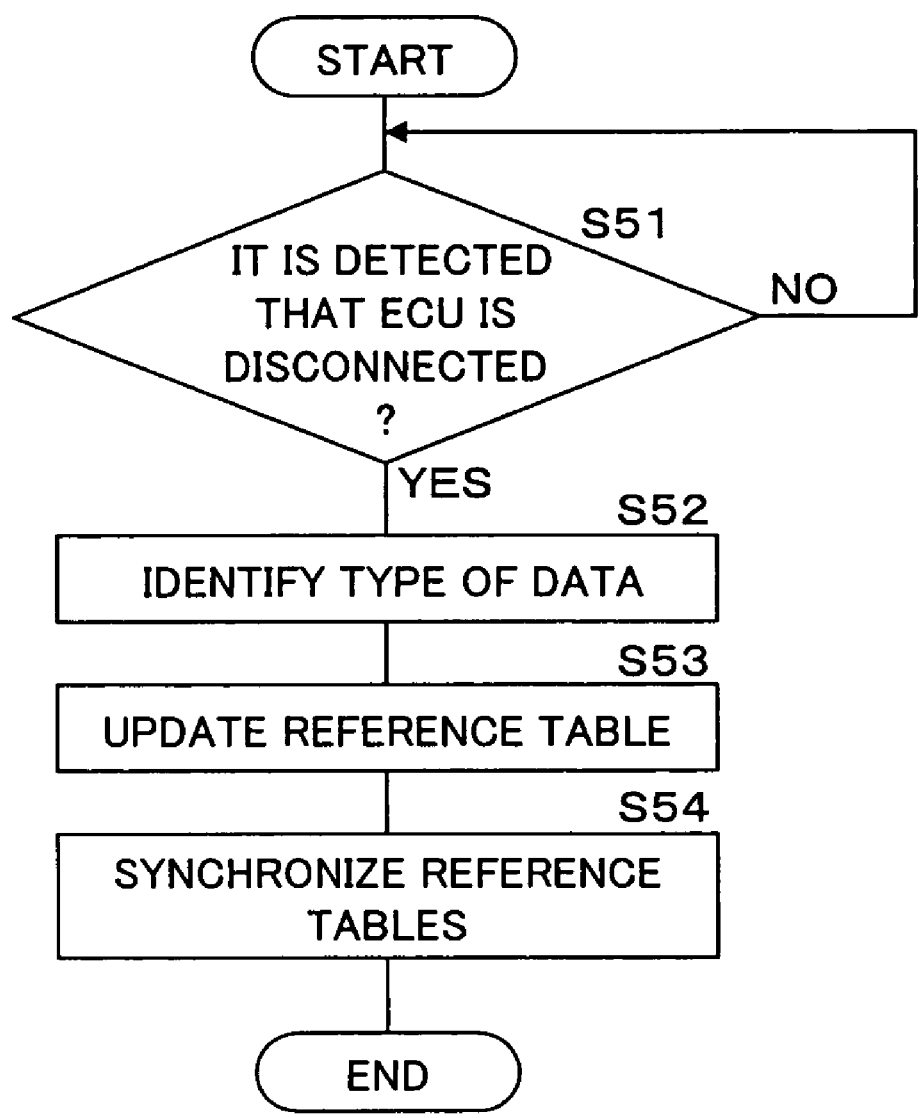
FIG. 8 is a flowchart showing a procedure for modifying the reference table by the control unit of the distribution apparatus according to an embodiment 2 in a case that one ECU is disconnected.

FIG. 8 is a flowchart showing a procedure for modifying the reference table by the control unit 10a of the distribution apparatus 1a according to an embodiment 2 in a case that one ECU 4x is disconnected.

The control unit 10a of the distribution apparatus 1a judges whether detecting that the ECU 4x is disconnected or not (step S51).

The detection at the step S51 is performed on the basis of a judgment whether no data is sent from the ECU 4x within a predetermined period or not. Alternatively, it may be configured that a notice representing the disconnection of the ECU 4x is sent to the distribution apparatus 1a and the control unit 10a of the distribution apparatus 1a receives the notice. The notice representing the disconnection of the ECU 4x may be sent from the ECU 4x or an external apparatus connected to the communication line 3a or the communication line 2.

When having judged that the control unit 10a of the distribution apparatus 1a does not detect the disconnection of the ECU 4x (S51: NO), the procedure is returned to the step S51 and the control unit 10a repeats the procedure until judging that the control unit 10a detects the disconnection of the ECU 4x.

When having judged that the control unit 10a detects the disconnection of the ECU 4x (S51: YES), the control unit 10a identifies the type of data sent from the ECU 4x (step S52). The control unit 10a deletes information about storage area (common areas 12a, 12b, 12c or non-common area 13a) storing the identified data type from the reference table 17a (step S53). After deleting the information, the control unit 10a sends the modified reference table 17a to the other distribution apparatuses 1b, 1c in order to synchronize the contents of the reference tables 17a, 17b, 17c with each other (step S54) and the procedure is completed.

The procedure shown by the flowchart of FIG. 8 can implement automatic modification of the contents of the reference tables 17a, 17b, 17c in response to the disconnection of the previously connected ECU 4x. Thus, it is possible to flexibly respond to the connecting architecture of the distribution apparatuses 1a, 1b, 1c and the ECUs 4a, 4a, . . . , 4b, 4b, . . . , 4c, 4c, . . . . Therefore, it is possible to minimize amounts of data stored on the common areas 12a, 12b, 12c of within the databases 11a, 11b, 11c of the distribution apparatuses 1a, 1b, 1c.

The contents of the reference tables may be kept without the modification based on the procedure shown by the flowchart of FIG. 8, when the ECU 4x is disconnected.

In the embodiment 1 and the embodiment 2, a configuration is illustrated that data is previously determined on the basis of the data type to store on any of the common areas 12a, 12b, 12c or the non-common areas 13a, 13b, 13c and the determination is stored on the reference tables 17a, 17b, 17c. However, the present invention is not limited to this configuration. The control unit 10a of the distribution apparatus 1a may determine to add data on the common area 12a, after receiving from the ECUs 4a, 4a, . . . connected to the distribution apparatus 1a no less than a predetermined times a sending request of sending the data stored any of the non-common areas 13b, 13c of the other distribution apparatuses 1b, 1c. In this configuration, the control unit 10a updates the reference table 17a and then synchronizes with the reference tables 17b, 17c of the other distribution apparatuses 1b, 1c. Therefore, it is also possible to dynamically modify the contents of the reference tables 17a, 17b, 17c, and to flexibly determine the storage area, among the common areas 12a, 12b, 12c and the non-common areas 13a, 13b, 13c, that data should be stored for the modification.

While the flowcharts of FIGS. 4-8 represent procedures performed by the control unit 10a of the distribution apparatus 1a according to the embodiment 1 and the embodiment 2, the procedures do not include steps of discrepancy management for addressing generated abnormality during the procedures. However, the steps of discrepancy management are required in order to implement each procedure especially during loop steps, for example, at the step S11 in the procedure shown by the flowchart of FIG. 4, at the step S311 in the procedure shown by the flowchart of FIG. 6 and the like, for waiting information, such as data or notice. It may be configured for the discrepancy management, for example, to perform a separate judgment with a timer whether a predetermined time is passed or not, and to return the procedure to an initial condition with discarding each step and request when it is judged that a predetermined time is passed.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A first distribution apparatus performing data transmission with a plurality of external devices and a second distribution apparatus, the first distribution apparatus comprising:
   a receiving unit that receives data sent from an external device and data sent from the second distribution apparatus;
   a storage unit configured with a common area and a non-common area so as to store data received by the receiving unit;
   a sending unit configured to send data stored by the storage unit toward the external device or the second distribution apparatus; and
   a determining unit configured to perform a determination whether data received from the external device by the receiving unit is a type of data stored on the common area or on the non-common area, wherein
   the storage unit stores the data received from the external device by the receiving unit onto the common area when the determining unit determines that the data received from the external device by the receiving unit is a type of data stored on the common area,
   the storage unit stores the data received from the external device by the receiving unit onto the non-common area, when the determining unit determines that the data received from the external device by the receiving unit is a type of data stored on the non-common area, and
   the storage unit stores the data received from the second distribution apparatus by the receiving unit onto the common area such that data of the common area of the first distribution apparatus and data of a common area of the second distribution apparatus are periodically synchronized, wherein, the first distribution apparatus and the second distribution apparatus are on-board equipment for a car and an operating status is stored on the common area.

2. A first distribution apparatus according to claim 1, wherein
the storage unit stores a storage destination information that represents data type to be stored on the common area and data type to be stored on the non-common area; and
the determining unit performs the determination based on the storage destination information.

3. A first distribution apparatus according to claim 1, wherein
the external device is an electronic control unit adapting for car;
the first distribution apparatus performs data transmission with a plurality of electronic control units; and
the second distribution apparatus performs data transmission with another plurality of electronic control units.

4. A first distribution apparatus according to claim 2, wherein
the storage destination information comprises information regarding data stored in the second external device;
the external device sends sending request data that requests to send a specific data;
the distribution apparatus further comprises a judge unit that judges in accordance with the storage destination information whether the specific data requested by the sending request data is sent to the second distribution apparatus or not; and
the sending unit sends sending request data that requests to send the specific data toward the second distribution apparatus, when the judge unit judges that the specific data is sent to the second distribution apparatus.

5. A first distribution apparatus according to claim 2, wherein the storage destination information can be modified.

6. A first distribution apparatus according to claim 4, wherein
the storage destination information can be modified.

7. A communication system having a plurality of distribution apparatuses each connected to a communication apparatus group configured with a plurality of communication apparatuses transmitting several types of data, wherein
each distribution apparatus is interconnected to another distribution apparatus, and
each distribution apparatus comprises:
a receiving unit that receives data sent from a connected communication apparatus and data sent from another distribution apparatus;
a storage unit configured with a common area and a non-common area so as to store data received by the receiving unit;
a sending unit configured to send data stored by the storage unit to a connected communication apparatus or another distribution apparatus; and
a determining unit configured to perform a determination whether data received from the connected communication apparatus by the receiving unit is a type of data stored on the common area or on the non-common area,
wherein the storage unit stores the data received from the connected communication apparatus by the receiving unit onto the common area when the determining unit determines that the data received from the connected communication apparatus by the receiving unit is a type of data stored on the common area,
the storage unit stores the data received from the connected communication apparatus by the receiving unit onto the non-common area when the determining unit determines that the data received from the connected communication apparatus by the receiving unit is a type of data stored on the common area, and
the storage unit stores the data received from the another distribution apparatus by the receiving unit onto the common area such that data of the common area of the distribution apparatus and data of a common area of the another distribution apparatus are periodically synchronized,
the communication system is an on-board communication system for a car and an operating status is stored on the common area.

8. A communication system according to claim 7, wherein
the storage unit stores a storage destination information that represents data type to be stored on the common area and data type to be stored on the non-common area; and
the determining unit performs the determination based on the storage destination information.

9. A communication system according to claim 7, wherein each communication apparatus is an electronic control unit.

10. A communication system according to claim 8, wherein
the storage destination information comprises information regarding data stored in said each distribution apparatus;
each communication apparatus sends sending request data that requests to send a specific data;
said each distribution apparatus further comprises a judge unit that judges in accordance with the storage destination information whether the specific data requested by the sending request data is stored in another distribution apparatus or not; and
the sending unit sends sending request data that requests to send the specific data toward said another distribution apparatus, when the judge unit judges that the specific data is stored in said another distribution apparatus.

11. A communication system according to claim 8, wherein said each distribution apparatus further comprises:
a detecting unit that detects a connection of a new communication apparatus;
an obtaining unit that obtains a type of data being sent from the new communication apparatus detected by the detecting unit; and
an adding unit that performs an addition of the data type obtained by the obtaining unit onto the storage destination information, wherein
the sending unit sends the storage destination information after the addition performed by the adding unit toward another distribution apparatus.

12. A communication system according to claim 8, wherein
said each distribution apparatus further comprises:
a detecting unit that detects a disconnection of the connected communication apparatus;
an obtaining unit that obtains a type of data having been sent from the disconnected communication apparatus detected by the detecting unit; and
a deleting unit that performs a deletion of the data type obtained by the obtaining unit from the storage destination information, wherein
the sending unit sends the storage destination information after the deletion performed by the deleting unit toward another distribution apparatus.

13. A communication method incorporating a communication system having a plurality of distribution apparatuses each interconnected to another distribution apparatus and each connected to a communication apparatus group configured with a plurality of communication apparatuses transmitting several types of data, comprising the following computer-implemented steps of:

preparing a storage unit for each distribution apparatus, the storage unit storing received data and being configured with a common area and a non-common area;

allowing said each distribution apparatus to receive data being sent from a communication apparatus and another distribution apparatus that are connected to said each distribution apparatus;

allowing said each distribution apparatus to store the received data on its own storage unit;

allowing said each distribution apparatus to send the data stored on its own storage unit toward a communication apparatus or another distribution apparatus that are connected to said each distribution apparatus; and allowing said each distribution apparatus to perform a determination whether the received data should be stored on the common area or the non-common area, wherein the data received from the connected communication apparatus is stored, in accordance with a result of the determination, on the common area when it is determined that the data received from the connected communication apparatus is a type of data stored on the common area, the data received from the connected communication apparatus is stored, in accordance with a result of the determination, on the non-common area when it is determined that the data received from the connected communication apparatus is a type of data stored on the non-common area, the data received from the another distribution apparatus is stored on the common area such that the data of the common areas of the plurality of distribution apparatuses are periodically synchronized with each other, the communication system is an on-board communication system for a car and an operating status is stored on the common area.

14. A communication method according to claim 13, wherein said each communication apparatus is an electronic control unit.

15. A communication method according to claim 13, further comprising the following computer-implemented step of:

allowing said each distribution apparatus to store a storage destination information that represents data type to be stored on the common area and data type to be stored on the non-common area, wherein the result of the determination is based on the storage destination information.

16. A communication method according to claim 15, further comprising the following computer-implemented steps of:

allowing said each distribution apparatus to detect a connection of a new communication apparatus;

allowing said each distribution apparatus to obtain a type of data being sent from the detected new communication apparatus;

allowing said each distribution apparatus to perform an addition of the obtained data type onto its own storage destination information; and allowing said each distribution apparatus to send the storage destination information after performing the addition toward another distribution apparatus.

17. A communication method according to claim 15, further comprising the following computer-implemented steps of:

allowing said each distribution apparatus to detect a disconnection of the connected communication apparatus;

allowing said each distribution apparatus to obtain a type of data having been sent from the disconnected communication apparatus;

allowing said each distribution apparatus to perform a deletion of the obtained data type from the storage destination information; and allowing said each distribution apparatus to send the storage destination information after performing the deletion toward another distribution apparatus.

* * * * *